W. E. MATTISON.
Safety-Seat for Harvester.

No. 165,424.  Patented July 13, 1875.

WITNESSES:
A. W. Almqvist
A. T. Terry

INVENTOR:
William E. Mattison
BY Munn & Co
ATTORNEYS.

UNITED STATES PATENT OFFICE.

WILLIAM E. MATTISON, OF NEW BRUNSWICK, NEW JERSEY, ASSIGNOR TO WM. E. MATTISON AND EDWIN GULICK, OF SAME PLACE.

IMPROVEMENT IN SAFETY-SEATS FOR HARVESTERS.

Specification forming part of Letters Patent No. 165,424, dated July 13, 1875; application filed October 24, 1874.

*To all whom it may concern:*

Figure 1:
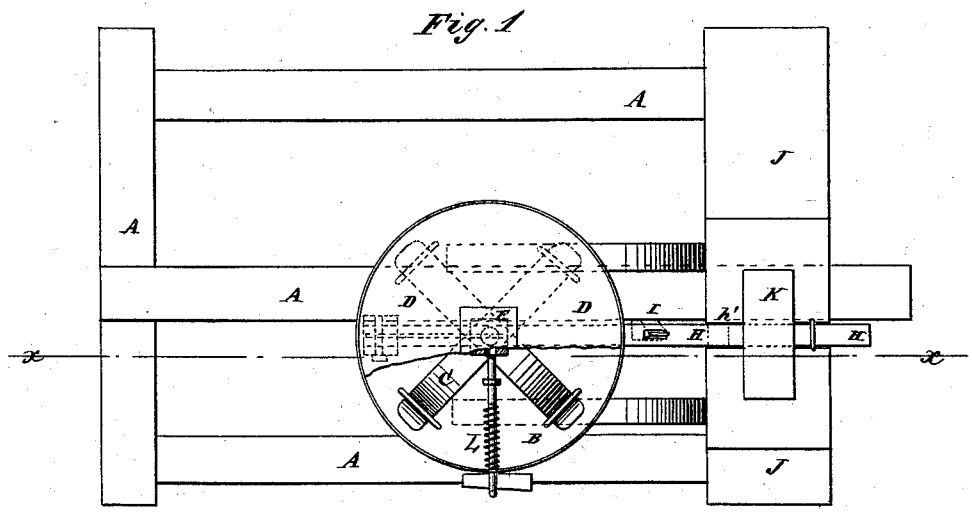
Figure 2:
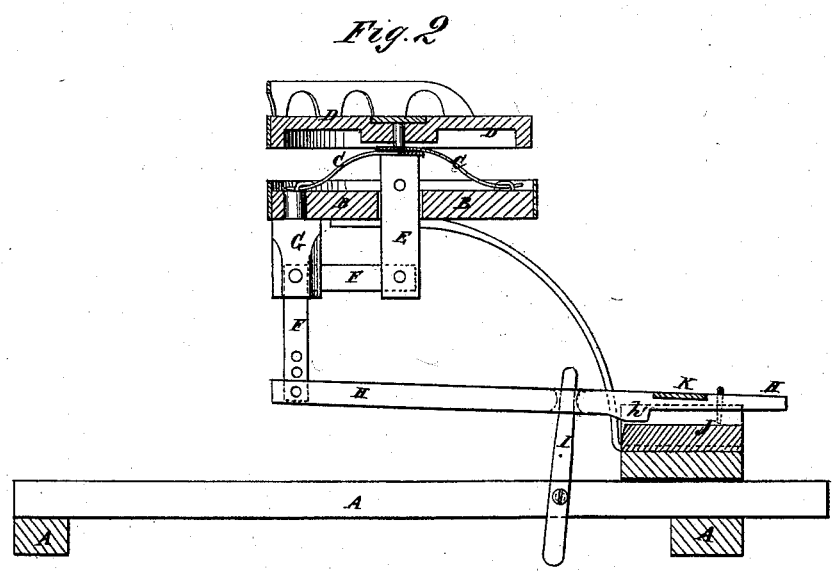

Be it known that I, WILLIAM E. MATTISON, M. D., of New Brunswick, in the county of Middlesex and State of New Jersey, have invented a new and useful Improvement in Safety-Seat for Reapers and Mowers, of which the following is a specification:

Figure 1 is a top view of my improved device, part being broken away to show the construction. Fig. 2 is a vertical section of the same, taken through the line $x\ x$, Fig. 1.

Similar letters of reference indicate corresponding parts.

My invention has for its object to furnish an improved safety-seat for reapers and mowers, which shall be so constructed that should the driver be thrown from or leave his seat the mechanism that drives the cutters will be thrown out of gear, and the cutters will cease to vibrate, so as to guard against the danger of his being cut by the cutters should he be thrown upon or in front of said knives, or should the machine be started while he is in front of them.

The invention consists in the shoulders formed upon, and the foot-rest attached to, the connecting-bar, in combination with the said bar, the bent lever, the bar, the seat, the springs, the platform, and shifting-lever, as hereinafter fully described.

A represents the frame-work of a reaper or mower. B is the lower or stationary part or platform of the seat, which is connected with and supported from the frame A. To the platform B are attached springs C, upon which the driver's seat D rests, and which are made of such a strength as to be compressed by the driver's weight, and allow the seat D to rest upon the platform B; but should the driver's weight be removed from the seat D the springs C will immediately raise the said seat D from the platform B. To the center of the seat D is attached a rod or bar, E, which passes down through a hole in the center of the platform B, and to its lower end is pivoted the end of the elbow-lever F. The elbow-lever F is pivoted at its angle to a stud, G, attached to the platform B, and to its other end is pivoted the end of a bar, H, to which is pivoted the lever I, by which the cutting mechanism is thrown into and out of gear.

The lever I may be a straight or a bent lever, according to the construction of the machine to which the device may be attached.

The lever I may be connected with the ordinary clutch which throws the cutting mechanism in and out of gear, or with any other suitable device operating in a like manner.

As thus far described there is nothing new; but the device is defective, for the reason that should the machine receive a sudden jar from the drive-wheels dropping into a dead furrow, or striking an obstruction, the driver would be jolted upward, and the action of the knives would stop as soon as his weight left the seat, while the machine continued to advance, so that portions of the grain or grass would be left uncut. To remedy this defect I extend the bar H forward across the foot-board or platform J, where it rests, and slides in a groove or guide formed to receive it. Upon the under side of the bar H is formed a shoulder, $h'$, which is slightly beveled, and which, when the mechanism is in gear, rests against the slightly-beveled edge of the foot-board J, at the rear end of its groove. To the forward part of the bar H is attached a foot-rest, K, for the driver's feet to rest upon.

With this construction the weight of the driver's feet will hold the bar locked and the mechanism in gear, even should the driver be jolted up from the seat D; but should he be thrown from or leave the machine, the slightest jar of the machine will release the bar H, and throw the cutting mechanism out of gear.

If desired, a spring-bolt, L, or other catch, may be attached to the platform B, to take hold of the post or bar E, and lock the seat D in either position, when required.

Having thus described my invention, I claim as new and desire to secure by Letters Patent—

The bar H, formed with the shoulder $h'$, and carrying the foot-rest K, in combination with the elbow-lever F, the bar E, the seat D, the spring C, the platform B, and the lever I, substantially as herein shown and described.

WILLIAM E. MATTISON.

Witnesses:
OLIVER A. KIBBE,
ANDREW O. RAPPLEYEA.